Nov. 2, 1926.  1,605,826
H. A. FISHER
ROLL FOR USE IN METAL ROLLING
Filed May 13, 1925  2 Sheets-Sheet 1
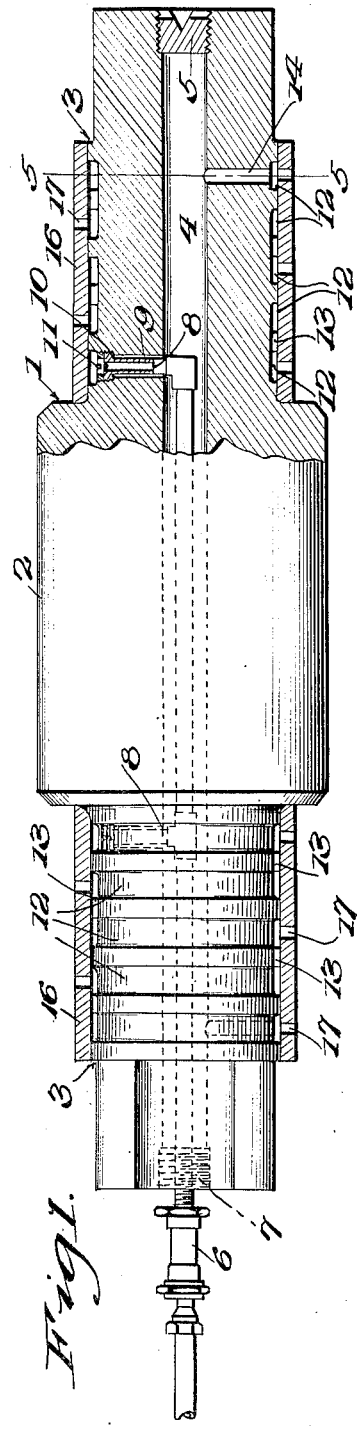
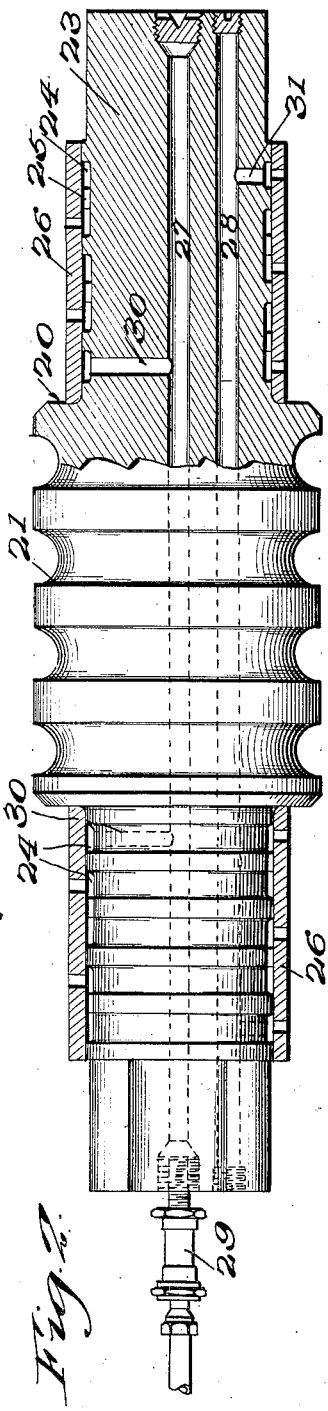
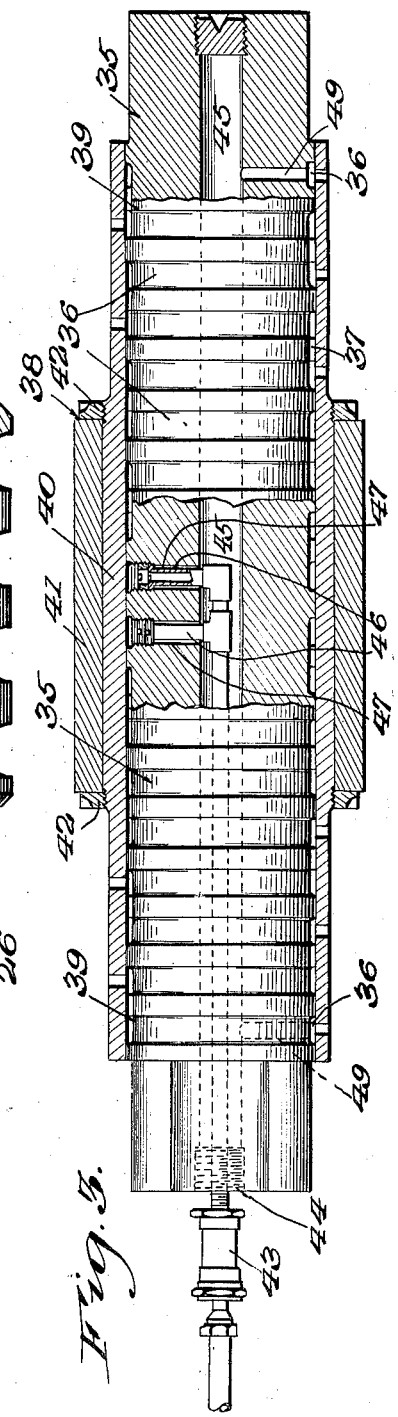
WITNESSES
INVENTOR
H. A. Fisher
BY
ATTORNEYS Nov. 2, 1926.
H. A. FISHER
ROLL FOR USE IN METAL ROLLING
Filed May 13, 1925   2 Sheets-Sheet 2
1,605,826
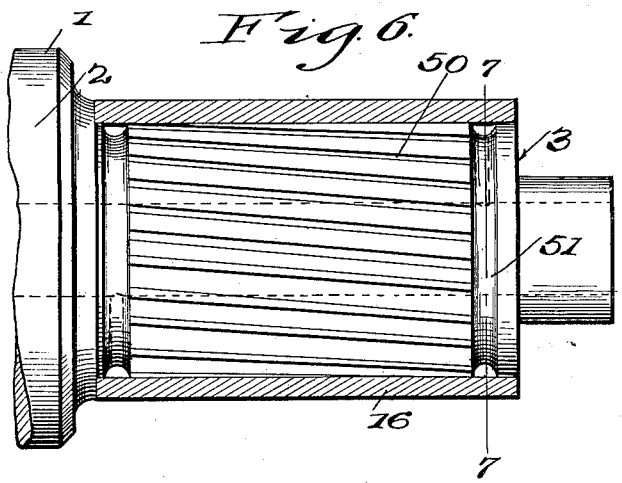
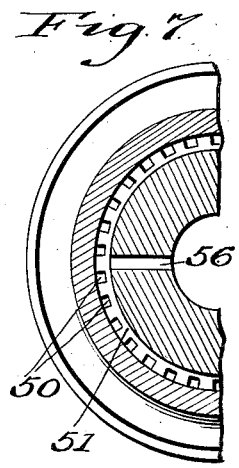
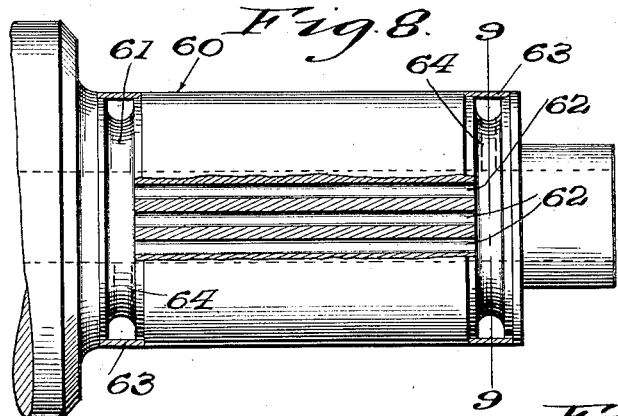
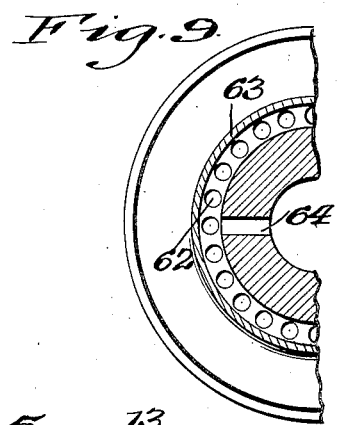
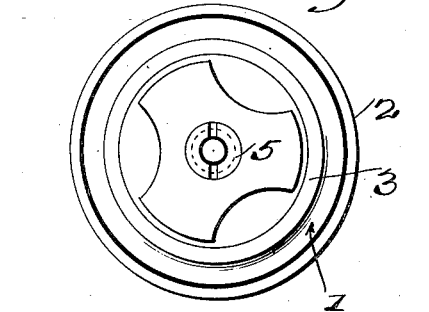
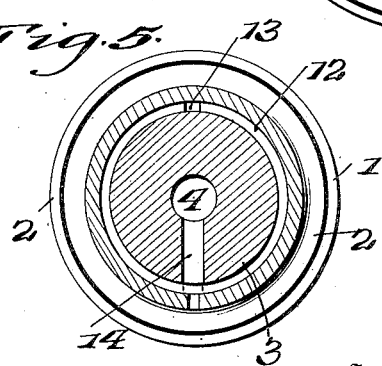
Witnesses
R. A. Thomas
U. F. Luckley
Inventor
H. A. Fisher
By Munn & Co
Attorney Patented Nov. 2, 1926.

1,605,826

UNITED STATES PATENT OFFICE.

HERMAN ARTHUR FISHER, OF WORCESTER, MASSACHUSETTS.

ROLL FOR USE IN METAL ROLLING.

Application filed May 13, 1925. Serial No. 30,050.

This invention relates to an improvement in rolls used in metal rolling, and has for its object the provision of an improved roll which is of simple and durable construction, reliable and effective in operation and adapted to turn out rolled metal of uniform gage and shape.

In the metal rolling art, considerable difficulty has been experienced due to the fact that the rolls become heated, the heat being generated in the bearings as a result of the extremely high bearing pressures. The generation of the heat in the bearings which occur at the ends of the rolls results in an irregular expansion of the roll which causes the roll to impart to the metal operated upon irregular and undesirable gage and shape.

One of the principal objects of the present invention resides in the provision of an improved roll wherein the heat generated in the bearings is absorbed and dissipated in a construction which is simple and practical and adapted for manufacture at a comparatively slight cost from materials and by means of facilities ordinarily available.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in elevation and partly in section showing a roll constructed in accordance with the present invention, Figure 2 is a view similar to Figure 1 showing a slightly different embodiment of the invention, Figure 3 is a similar view showing the invention embodied in another type of roll, Figure 4 is a view in end elevation looking toward the left of Figure 1, Figure 5 is a view in transverse section on the line 5—5 of Figure 1, Figure 6 is a fragmentary view partly in elevation and partly in section showing another embodiment of the invention, Figure 7 is a fragmentary view in section on the line 7—7 of Figure 6, Figure 8 is a fragmentary view partly in section and partly in elevation showing still another embodiment of the invention, and Figure 9 is a fragmentary view in section on the line 9—9 of Figure 8.

Referring to the drawings and more especially to Figures 1, 4 and 5, the numeral 1 designates generally a roll adapted for use in rolling metal, and comprising a roll body 2 and necks 3, the necks 3 being adapted for mounting in bearings (not shown).

The present invention proposes the provision of means for cooling the peripheral portions of the necks 3 so as to absorb the heat generated by the excessive bearing pressures and carrying off such heat, whereby to prevent distortion of the roll. In carrying out this purpose, the roll is provided with an axial opening 4 one end of which is closed by a plug 5. A supply pipe 6 is extended through a plug 7 provided in the other end of the opening 4 and this supply pipe 6 has branches 8 which lead through radial openings 9 formed in the necks 3. The outer ends of the branch pipes 8 have flanges 10 threadedly connected with the necks in which they are mounted, and may be held in position by means of annular nuts 11. Water or other suitable cooling medium is supplied through the supply pipes 6 and branch pipes 8.

The periphery of each neck 3 is formed with a plurality of spaced annular grooves 12 connected with each other by slots 13 formed in the ribs defining the grooves, the slots 13 of adjacent ribs being diametrically opposite each other to insure a complete circulation of the cooling medium. As shown in Figure 1, the branch pipes 9 connect to the innermost annular grooves 12. The outermost annular grooves 12 communicate with radial return passages 14 which lead into the axial opening 4 of the roll. An off-take pipe is suitably connected with one of the plugs which closes the end of the axial opening 4 so as to carry off the cooling medium which has absorbed heat.

A sleeve 16 is shrunk or otherwise suitably secured on each neck 3 and covers the grooves 12 so that these grooves provide closed passages. If desired, a number of openings 17 may be provided in each sleeve 16 opposite underlying grooves 12 for the purpose of supplying a certain amount of cooling medium to the bearings in which the necks are mounted. It is to be understood that these openings 17 may be omitted, continuous imperforate sleeves 16 being employed, or else these openings may be suitably plugged.

In the form of the invention shown in

Figure 2, the body of the roll which is designated at 20, has peripheral grooves 21 to adapt it for the work for which it is intended. The necks 3 of the roll in Figure 2 are constructed exactly as the necks 3 in Figure 1, the necks 3 having peripheral grooves 24 connected by slots 25, and having sleeves 26 shrunk or otherwise suitably secured on their peripheries. In the roll shown in Figure 2, an axial opening 27 and a parallel eccentric opening 28 are provided. The cooling medium is supplied from a pipe 29 to the axial opening 27 and flows through radial slots 30 to the innermost peripheral grooves 24. The cooling medium after having absorbed the heat from the necks of the rolls passes through slots 31 into the eccentric passage 28 and from the eccentric passage 28 to a suitable off-take pipe connected with one of the plugs which closes the ends of the passage 28.

In the form of the invention shown in Figure 3, the roll has a core 35 having annular grooves 36 throughout the extent of its periphery, adjacent annular grooves being connected by slots 37. This core 35 forms a part of the body of the roll and also a part of the body of the necks thereof, the body of the roll being designated generally at 38 and the necks being designated generally at 39. An elongated sleeve 40 is shrunk or otherwise suitably secured on the core 35, and this sleeve also forms a part of the roll body as well as part of the necks thereof. A shell 41 is positioned centrally of the sleeve 40 and is held in position by nuts 42, and said shell completes the roll body. In this form of the invention the roll body as well as the necks are cooled, and in carrying out this purpose, a supply pipe 43 is provided and is extended through a plug 44 to one end of the axial opening 45 provided in the core 35. Branch pipes 46 are connected to the pipe 43 adjacent its inner end and extend through radial openings 47 in the core 35 to the grooves 36 located centrally of the core. Radial return passages 49 are provided between the outermost annular grooves 36 and the axial opening 45, so that the cooling medium which has absorbed heat will pass into this axial opening 45 and thence out through a suitable off-take pipe connected to one of the plugs which closes the end of the axial opening 45.

The form of the invention shown in Figures 6 and 7 is identical with that shown in Figure 1, except for the construction of the periphery of the necks of the roll. In Figures 6 and 7, the necks of the roll have inclined grooves 50 in their peripheries and these inclined grooves 50 communicate with annular grooves 51 at their ends. The annular grooves 51 communicate with radial passages 56 which lead to the axial passage 24 of the roll. One of the passages 56 of each neck is connected to the branch pipe 8 of the supply pipe 6, and the other passage 56 may carry a cooling medium which has absorbed the heat back into the axial passage 4. As in the other embodiments of the invention, the sleeves 16 are shrunk on the necks.

The form of the invention shown in Figures 8 and 9 is very similar to the form of the invention shown in Figures 1, 4 and 5, and the form of the invention shown in Figures 6 and 7, except for the construction of the necks of the roll. In Figures 8 and 9, the necks of the roll are designated at 60 and are shown as having spaced annular grooves 61 connected by lengthwise holes 62 drilled through the necks between the grooves and just inward of the periphery of the necks. Rings 63 are provided for closing the peripheral grooves 61. The peripheral grooves 61 communicate with the axial opening of the roll by means of peripheral grooves 64, and the cooling medium is supplied to and carried away from these passages 64 as in the other embodiments of the invention.

In all forms of the invention except the form shown in Figure 3, the substantially solid formation of the body of the roll is preserved, and at the same time distortion is prevented by cooling the necks of the roll in an effective and efficient manner. In Figure 3, the roll is cooled for its entire length, and of course this necessitates a special roll body construction.

It will be obvious that the cooling medium is of substantially the same temperature in one neck as the cooling medium in the other neck, as the medium is simultaneously fed from a point or points near the center of the roll to the necks. Consequently the medium which has cooled one neck leaves the roll and is not immediately sent to the other neck as in most prior art construction.

While I have referred in the foregoing description to the axial passage 4 as receiving a cooling medium from the passage 56, it might be said that the main purpose of this axial passage 4 is to permit the exploration of the center of the roll for pipes or cracks which might be in the billet or ingot from which the roll was forged.

I claim:—

1. A roll having a body and integral necks, the necks each being formed with connected annular grooves adjacent their peripheries, and means for circulating a cooling medium independently through said necks.

2. A roll having a body and integral necks, and means including interconnected passages for circulating independent streams of fluid of approximately equal temperature simultaneously through each of said necks beneath the peripheries thereof.

3. A roll having a body and integral necks, and means including interconnected passages for circulating a cool fluid simultaneously and independently through each of said necks beneath the peripheries thereof.

4. A roll having a body and integral necks formed with connected annular grooves, said roll having a lengthwise passage extending through the body and through the necks, said necks having transverse passages connecting the longitudinal passage with the grooves of the necks, a supply pipe having branches extending through certain of said transverse passages for supplying a cooling medium to certain of said grooves, the cooling medium travelling through the grooves and back into the lengthwise passages through the remaining transverse passages.

5. A roll having a body and integral necks provided with a plurality of annular grooves, said necks having slots connecting the grooves, sleeves fitted and secured on the necks whereby the grooves and slots provide closed passageways in the necks adjacent the peripheries thereof, and means for supplying cooling medium to said passageways.

6. A roll having a body and integral necks provided with a plurality of annular grooves, said necks having slots connecting the grooves, sleeves fitted and secured on the necks whereby the grooves and slots provide closed passageways in the necks adjacent the peripheries thereof, and means for supplying cooling medium to said passageways, and comprising a supply pipe, said roll having a lengthwise passage through which said supply pipe extends, said supply pipe having branches, said necks having transverse openings receiving the branches, the branches supplying the innermost annular grooves with cooling medium, said necks having transverse passages between the outermost annular grooves and the lengthwise passage for carrying off the heated cooling medium.

7. A roll having a core provided with spaced annular grooves, said core having slots connecting its grooves, a sleeve fitted and secured on the core, a shell mounted on the sleeve, means for holding the shell in position, and means for circulating cooling medium through the grooves of the core.

8. A roll having a body and necks provided with passageways adjacent their peripheries, and means for circulating cooling medium through the passageways of the necks there being openings for permitting a certain amount of the cooling medium to pass to the outsides of the peripheries of the necks.

9. A roll, comprising a body and an integral neck, grooves on said neck, a sleeve on said neck enclosing said grooves and thereby forming annular passages for the circulation of a cooling medium.

10. A roll comprising a body and integral necks, grooves on both, and a sleeve fitted over both the body and necks to thereby form annular passages for the circulation of a cooling medium in these grooves between the body of the roll and the sleeve.

11. A roll, comprising a core and integral necks, a friction surface on each neck, means to carry away heat generated by friction at the necks and prevent same from entering the roll body, comprising interconnected coolant circulating passages beneath the periphery of said surfaces.

12. A roll, comprising a core and a neck portion, an outer bearing sleeve on said neck portion, coolant circulating passages formed between said sleeve and said neck portion.

13. A roll, comprising a core and a neck portion, an outer bearing sleeve on said neck portion, coolant circulating passages formed between said sleeve and said neck portion, the passages at either end of the roll being independently supplied with coolant by a feed pipe carried through the center of the roll.

HERMAN ARTHUR FISHER.